(12) United States Patent
Grant et al.

(10) Patent No.: US 12,170,007 B2
(45) Date of Patent: Dec. 17, 2024

(54) COMPUTER LEARNING FOR MERCHANDISE SECURITY

(71) Applicant: InVue Security Products Inc., Charlotte, NC (US)

(72) Inventors: Jeffrey A. Grant, Charlotte, NC (US); Christopher J. Fawcett, Charlotte, NC (US); Laura Abbott Lynch, Charlotte, NC (US); Gary A. Taylor, Fort Mill, SC (US); David N. Berglund, Indian Trail, NC (US); James Richard Terrell, II, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 327 days.

(21) Appl. No.: 17/441,369

(22) PCT Filed: Mar. 26, 2020

(86) PCT No.: PCT/US2020/024961
§ 371 (c)(1),
(2) Date: Sep. 21, 2021

(87) PCT Pub. No.: WO2020/198473
PCT Pub. Date: Oct. 1, 2020

(65) Prior Publication Data
US 2022/0180719 A1    Jun. 9, 2022

Related U.S. Application Data

(60) Provisional application No. 62/828,610, filed on Apr. 3, 2019, provisional application No. 62/824,476, filed on Mar. 27, 2019.

(51) Int. Cl.
*G08B 13/14*    (2006.01)
*G08B 13/02*    (2006.01)
(Continued)

(52) U.S. Cl.
CPC ....... *G08B 13/19613* (2013.01); *G08B 13/14* (2013.01); *G08B 13/19645* (2013.01); *G08B 31/00* (2013.01); *G06N 20/00* (2019.01)

(58) Field of Classification Search
CPC ........ G08B 13/14; G08B 13/02; G08B 13/06; G08B 13/08; G08B 13/10; G08B 13/12;
(Continued)

(56) References Cited

U.S. PATENT DOCUMENTS 7,737,845 B2    6/2010 Fawcett et al.
11,468,681 B1 *  10/2022 Kumar ................... G06V 40/10
(Continued)

FOREIGN PATENT DOCUMENTS

WO    2018089349 A1    5/2018

OTHER PUBLICATIONS

International Search Report and Written Opinion from corresponding International Application No. PCT/US2020/024961, dated Jun. 19, 2020 (16 pages).
(Continued)

*Primary Examiner* — Daquan Zhao
(74) *Attorney, Agent, or Firm* — InVue Security Products Inc.

(57) ABSTRACT

Embodiments of the present invention are directed to systems, devices, and methods for displaying and securing articles of merchandise. In one example, a merchandise security system includes a plurality of articles of merchandise on display in a retail store and at least one machine learning camera configured to capture images of one or more of the articles of merchandise for detecting information regarding the articles of merchandise, making predictions based on such information, and providing notifications based on such information.

20 Claims, 6 Drawing Sheets

(51) Int. Cl.
*G08B 13/06* (2006.01)
*G08B 13/196* (2006.01)
*G08B 31/00* (2006.01)
*G06N 20/00* (2019.01)
*G08B 13/00* (2006.01)

(58) Field of Classification Search
CPC ...... G08B 13/00; G08B 13/196; G08B 15/00; G08B 31/00
USPC ................... 348/61, 346, 184, 211.8, 211.13
See application file for complete search history.

(56) References Cited

U.S. PATENT DOCUMENTS

| | | |
|---|---|---|
| 2004/0125206 A1 | 7/2004 | Lohmann |
| 2009/0121017 A1* | 5/2009 | Cato .................... G06Q 10/087 235/385 |
| 2010/0118144 A1* | 5/2010 | Fawcett ............... G08B 15/001 348/143 |
| 2018/0035827 A1 | 2/2018 | Grant et al. |
| 2018/0137462 A1* | 5/2018 | Zohar .................... G06N 20/00 |
| 2018/0247504 A1 | 8/2018 | Siminoff et al. |
| 2019/0043207 A1 | 2/2019 | Carranza et al. |
| 2019/0080277 A1 | 3/2019 | Trivelpiece et al. |

OTHER PUBLICATIONS

Du, Lisa, and Maki, Ayaka, "These Cameras Can Spot Shoplifters Even Before They Steal.", retrieved from <https://www.bloomberg.com/news/articles/2019-03-04/the-ai-cameras-that-can-spot-shoplifters-even-before-they-steal>, dated Mar. 4, 2019.
Extended European Search Report from corresponding European Application No. 20778293.9-1205, dated Nov. 9, 2022.

* cited by examiner

COMPUTER LEARNING FOR MERCHANDISE SECURITY

CROSS REFERENCE TO RELATED APPLICATIONS

This application is a 371 National phase entry of International Application No. PCT/US2020/024961, filed on Mar. 26, 2020, which claims the benefit of priority to U.S. Provisional Application No. 62/824,476, filed on Mar. 27, 2019, and U.S. Provisional Application No. 62/828,610, filed on Apr. 3, 2019, the entire disclosures of which are incorporated herein by reference.

FIELD OF THE INVENTION

Embodiments of the present invention relate generally to merchandise display systems and methods, in particular, to systems and methods using machine or computer learning for retail security and analytics and/or for acquiring data with articles of merchandise on display.

BACKGROUND OF THE INVENTION

Retailers routinely display articles of merchandise, such as phones and portable computers for customers to evaluate before making a purchase. Such merchandise is susceptible to theft. In addition, retailers desire to obtain various data regarding customers and shopping behaviors.

BRIEF SUMMARY

Embodiments of the present invention are directed to systems, devices, and methods for displaying and securing articles of merchandise. In one example, a merchandise security system includes a plurality of articles of merchandise on display in a retail store and at least one machine learning camera configured to capture images of one or more of the articles of merchandise for obtaining information regarding the articles of merchandise, making predictions based on such information, and providing notifications based on such information.

In another embodiment, a merchandise security system includes a plurality of articles of merchandise on display in a retail store and a plurality of security devices each configured to be attached to a respective one of the articles of merchandise. The security system further includes at least one machine learning camera configured to capture images of one or more of the articles of merchandise for obtaining information regarding the articles of merchandise, making predictions based on such information, and providing notifications based on such information.

In another embodiment, a method for displaying and securing articles of merchandise is provided. The method includes capturing images of one or more articles of merchandise on display in a retail store with at least one machine learning camera, obtaining information regarding the articles of merchandise with the at least one machine learning camera, making predictions based on such information with the at least one machine learning camera, and/or providing notifications based on such information.

In one embodiment, a merchandise security system includes a plurality of articles of merchandise on display in a retail store and arranged in a planogram, each of the plurality of articles of merchandise having a camera configured to capture images of its surroundings. The security system also includes a memory comprising a collection of expected images captured by each of the cameras, and a controller configured to communicate with each of the plurality of articles of merchandise and the memory. The controller is configured to compare the images captured by each of the cameras to the collection of expected images for determining information regarding the planogram.

In another embodiment, a method for displaying and securing articles of merchandise is provided. The method includes populating a memory with a collection of expected images captured by a plurality of cameras each associated with a respective article of merchandise on display in a retail store and arranged in a planogram, capturing images using the plurality of cameras, comparing the images captured by each of the cameras to the collection of expected images, and/or determining information regarding the planogram.

In one embodiment, a merchandise security system includes a plurality of articles of merchandise on display in a retail store and arranged in a planogram. The security system further includes a plurality of cameras associated with the articles of merchandise, wherein each of the cameras is configured to capture images of its surroundings. The security system also includes a memory comprising a collection of expected images captured by each of the cameras, and a controller configured to communicate with each of the plurality of cameras and the memory. The controller is configured to compare the images captured by each of the cameras to the collection of expected images for determining information regarding the planogram.

DETAILED DESCRIPTION

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

One or more embodiments of a system for displaying and securing an article of merchandise "M" are described below and shown. In some embodiments, various data may be obtained regarding articles of merchandise, customers, the surroundings, security devices, and/or the customer's shopping behavior which may be used by a retailer for various analytics. The article of merchandise M is typically a display model or an operational sample of merchandise, such as portable telephones, smart phones, computers (e.g. notebooks, laptops, tablets, etc.), e-readers, media players, IoT devices (e.g., thermostats), headphones, speakers, TVs, and the like, for a customer to examine before making a decision to purchase the item. Thus, the article of merchandise may be any type of device on display in a retail setting. The article of merchandise M is typically displayed in a manner that permits a prospective purchaser to evaluate the operation and features of the merchandise, while protecting the merchandise from a potential thief.

Figure 1:
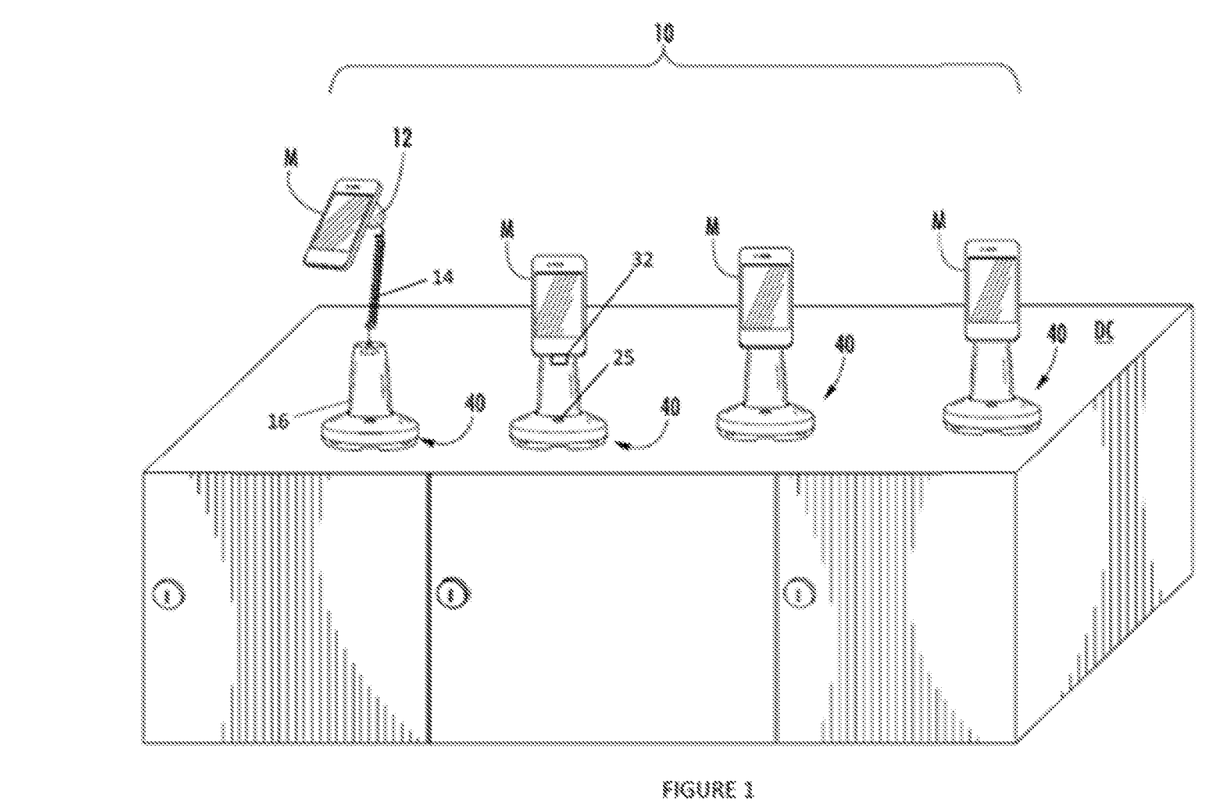
FIG. 1 illustrates a merchandise security system according to one embodiment of the present invention.
Figure 2:
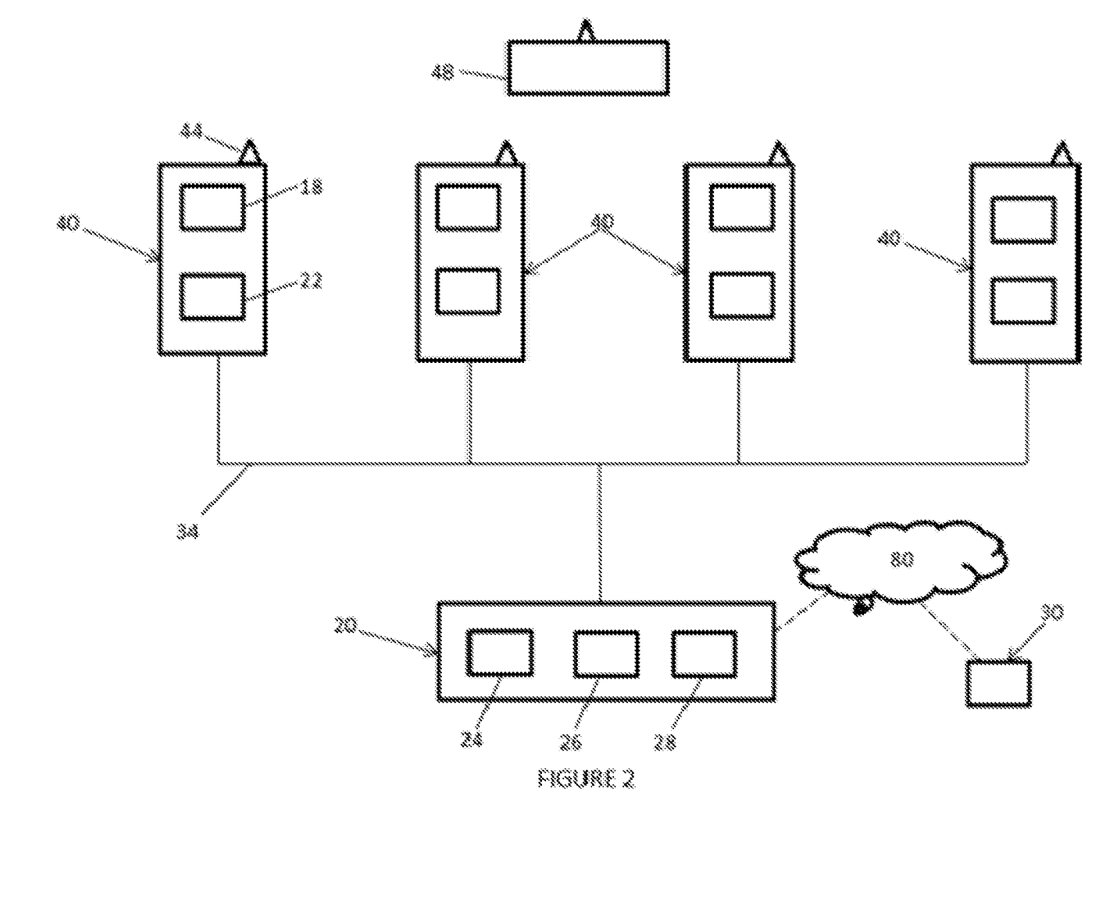
FIG. 2 illustrates a merchandise security system according to one embodiment of the present invention.

FIG. 1 illustrates an embodiment of a merchandise security system 10 for securing articles of merchandise M from theft or unauthorized removal. The system 10 generally includes one or more display positions, wherein each display position includes a security device 40 that is supported on a display counter "DC" (e.g., a counter, shelf, support, or the like). A security device 40 may generally include a sensor 12, a tether 14, and a base 16, although other arrangements may be contemplated (e.g., omitting the tether). The sensor 12 is configured to be secured to the article of merchandise M, such as with a pressure-sensitive adhesive, fasteners, and/or bracket arms. The sensor 12 is electrically connected to the tether 14, such as with a connector or via hardwiring. One end of the tether 14 may be electrically connected to the base 16, while the opposite end of the tether may be electrically connected to the sensor 12. The tether 14 and/or base 16 may be electrically connected to or otherwise in electrical communication with a controller 20, as explained in further detail below. In some embodiments, the tether 14 is electrically connected to a recoiler to allow the tether to extend and retract relative thereto. The recoiler may in turn be electrically connected to the controller 20. In other embodiments, the tether 14 is elastic or otherwise extendable and retractable relative to the base 16. Although four security devices are shown in FIGS. 1 and 2, it is understood that the controller 20 may be configured to communicate with any number of security devices, including one or more. Moreover, in some embodiments, one or more controllers 20 may be employed. In some embodiments, the controller 20 and the security devices 40 are independent of one another such that the controller may be positioned remotely from the security devices (e.g., under the display counter).

The base 16 is configured to removably support the sensor 12 thereon such that the sensor and article of merchandise M may be removed from the base for inspection and returned to the base. The base 16 may define an opening therethrough that allows the tether 14 to extend and retract relative to the base. It is understood that although a tethered embodiment is shown, it is understood that "tetherless" embodiments may also be utilized such as where the base 16 and the sensor 12 communicate wirelessly. For example, the base 16 and the sensor 12 may be configured to communicate wirelessly in order to ensure that the article of merchandise M is maintained within a predetermined location or distance relative to the base. In other embodiments, the article of merchandise M may be configured to be removably supported directly on the base 16 such that the sensor 12 may be integrated into the article. Example of wireless technology are disclosed in U.S. Pat. Nos. 8,878,673 and 9,437,088, the contents of which are hereby incorporated by reference in their entirety herein.

In some embodiments, the sensor 12 and/or base 16 may include alarming circuitry 18 or the like that is configured to determine whether various security events (e.g., removal of the article of merchandise from the security device 40 or authorized location) have occurred for generating a security signal, such as an audible and/or a visual alarm or signal (see, e.g., FIG. 2). The sensor 12 and/or base 16 may also include an alarm 22 (e.g., a piezoelectric device) that is configured to generate an audible alarm or signal. In some cases, the sensor 12 and/or base 16 may include a visual indicator (e.g., an LED) for emitting a visual signal when the alarming circuitry 18 is armed and/or alarming. Moreover, the sensor 12 and/or base 16 may include a transfer port 25 that is configured to communicate with a key for arming and/or disarming the alarming circuitry 18 (see, e.g., FIG. 1). In one embodiment, the transfer port 25 is configured to communicate wirelessly with a key in order to determine whether the key is authorized to arm and/or disarm the alarming circuitry 18. According to some embodiments, the key is similar to that described in U.S. Pat. No. 7,737,845, the contents of which are hereby incorporated by reference in their entirety herein. According to one embodiment, the sensor 12 may include a pressure switch or the like that is configured to detect when the article of merchandise M has been removed from the sensor. The alarming circuitry 18 may be configured to detect the removal of the article of merchandise M and/or cutting of the tether 14 and generate a security signal (e.g., an audible and/or a visual alarm) in response thereto.

The controller 20 may include a processor 24, CPU, or the like that is configured to facilitate communication with each of the security devices 40, both individually and collectively. For example, the controller 20 may be a digital interface box ("DIB") or a power interface box ("PIB") in some embodiments. The controller 20 may include communications circuitry 26 that is configured to transmit and receive signals and data from each of the security devices 40 and/or articles of merchandise M. The controller 20 may also include a memory 28 for storing various data regarding each of the security devices 40 and/or articles of merchandise M, as explained in further detail below. In one embodiment, the controller 20 is electrically connected to each of the security devices 40 via "wired" means, such as one or more electrical conductors 42. The controller 20 may be configured to transmit power to each of the security devices 40 and the articles of merchandise M via the electrical conductors 42. In other embodiments, the controller 20 and the security devices 40 may be configured to communicate with one another wirelessly. In order to provide power to the security devices 40, the security devices may utilize wireless power functionality, such as electrical contact or inductive charging technology. In addition, the controller 20 may be configured to transmit and/or regulate the voltage provided to each of the security devices 40 and/or articles of merchandise M. For example, the controller 20 may be in electrical communication with an input power source 46 and configured to transmit power at the appropriate voltage to each of the security devices 40 and the articles of merchandise M. Furthermore, it is understood that although the base 16 and controller 20 may be separate components in some embodiments, the base and controller may be integrated as a single component in other embodiments. For instance, the controller 20 may be housed in the base 16, and each base may include a respective controller.

In some embodiments, the controller 20 is configured to obtain data from the articles of merchandise M. For example, the data may be stored in a memory of the article of merchandise M, and the controller 20 may obtain at least a portion of the stored data. In some cases, the article of merchandise M may transmit the data from its internal memory to a sensor 12, controller 20, or any other desired device. The same controller 20 can communicate with the security devices 40 and the articles of merchandise, although it is understood that more than one controller could be employed, with separate controllers communicating with the security devices and articles of merchandise. The controller 20 may be configured to obtain the data directly or indirectly from the articles of merchandise. For example, each sensor 12 may be configured to communicate with a respective article of merchandise attached thereto to obtain data and subsequently communicate the data to the controller 20. In other embodiments, the controller 20 may receive the data directly from the articles of merchandise M. In some cases, the data is the type of article of merchandise M attached to a sensor 12 (e.g., a manufacturer and model of an article of merchandise). The type of article of merchandise M may allow the controller 20 to determine the power requirements of the specific type of article prior to sending power to the device. It is understood that various types of data and information may be obtained from the article of merchandise such as, for example, the number of "pulls" or "pickups" of a particular article of merchandise relative to the base, the type of article, the location of the article, the location of the security device, the power status of the article, retail store information and location, the occurrence and time of a power loss to the security device, a key ID, number and time of interactions with a key, etc. Thus, the controller 20 may obtain data periodically or in real time, or a user could use a remote device 30 to request information regarding a specific article(s) of merchandise M by communicating with the controller 20. Additional examples of types of data that may be collected in response to interaction with the article of merchandise may be found, for example, in U.S. Publication No. US 2018/0035827, entitled Systems and Methods for Acquiring Data from Articles of Merchandise on Display, the contents of which are hereby incorporated by reference in their entirety herein.

In some embodiments, the controller 20 and/or security device 40 may be configured to communicate with a remote device 30, such as a retailer's laptop, tablet, or other electronic device through a cloud network 80. In one example, the remote device 30 may be a retailer's electronic device for managing various data received from one or more controllers 20 and/or security devices 40. In one particular embodiment, a plurality of controllers 20 and/or security devices 40 are configured to communicate with one or more retailer's electronic devices over the network 80. For instance, the cloud network 80 may facilitate communication with a plurality of tablet devices used by sales associates within a retail environment. Communication over the network 80 may occur wirelessly. It is understood that the remote device 30, security device 40, and the controller 20 may communicate with any desired means, such as cellular networks, Wi-Fi, radiofrequency, Bluetooth communication, and the like. The controller 20, security device, and/or the remote device 30 may include communications circuitry or a transceiver that is configured to facilitate such communication with one another. One or more gateways and/or nodes may be used to facilitate communication between the controller 20, security device 40, and the retailer's electronic device(s). For instance, a gateway (e.g., a router) between the controller 20 and the cloud network 80 may be configured to facilitate communication with a retailer's gateway and may be configured to allow the retailer to provide and receive data from the system 10. The retailer may be able to direct various commands via the cloud network 80 such as, for example, ensuring planogram (placement of articles within a retail store) compliance and tracking system usage. In some embodiments, such commands could include requesting data from the controller 20, powering up or down one or more articles of merchandise M, arming or disarming a security device 40, performing a roll call of one or more articles of merchandise (either at a particular time or after an alarming event), determining a location of an alarming security device 40, identifying a specific key that armed/disarmed/locked/unlocked a particular security device, remotely enabling or disabling an article of merchandise, remotely locking down an article of merchandise, checking the power status of an article of merchandise, tracking usage of an article of merchandise, tracking one or more article of merchandise (e.g., via serial number or other ID), assigning particular keys to authorized users, and/or directing a camera to record the location of an alarming security device. As such, a retailer may be able to more effectively manage any number of features regarding one or more security devices 40.

In one embodiment, the security system 20 may utilize light-based technology (e.g., Visible Light Communication (VLC)) to determine various types of information regarding a security device 40 and/or article of merchandise M. For instance, the security device 40 and/or article of merchandise M may include an illumination source 44, such as an LED, that is configured to generate a uniquely coded light signal that may be used to provide various types of information and data and/or to determine the location of a particular illumination source 44 that is at a known location. The illumination source 44 may be configured to communicate with a computing device 48 that is configured to detect the uniquely coded light signals generated by the illumination source. For instance, the computing device 48 may include a camera for detecting such coded light signals. The coded light signals may be generated via activation of the illumination source 44 in a predetermined sequence or pattern. In some cases, the coded light signals may be indicative of specific information or data associated with the security device 40 and/or the article of merchandise, such as the types of information discussed above (e.g., a serial number of the article of merchandise). The computing device 48 may include a software application for facilitating communication with its camera and interpreting the light signals. Using the coded light signals, the computing device 48 may be configured to correlate the information or data with the security device 40 and/or the article of merchandise based on a known location of the security device and/or article of merchandise. For example, if a planogram indicates a particular location of a security device 40, the security device may be configured to communicate a light signal with information or data regarding the security device or associated article of merchandise. In other embodiments, the security device 40 and/or the article of merchandise M may be configured to communicate light signals indicative of its location. One or more computing devices 48 may be configured to communicate with one or more security devices 40, articles of merchandise M, controllers 20, and/or remote devices 30, such as via the cloud network 80, wired communications, and/or wireless communications. Thus, the security devices 40 and/or articles of merchandise M may be configured to communicate directly with the computing devices 48 in some embodiments. The computing device 48 may be configured to focus on, or block out, particular regions or zones that include security devices 40 and/or articles of merchandise M. In some cases, the computing device 48 may be configured to detect a particular QR code that may be associated with a security device 40 and/or an article of merchandise M. In this regard, the computing device 48 may be configured to detect the QR code and correlate the QR code with a particular security device 40 and/or article of merchandise M at a known location. Therefore, in some embodiments, VLC technology may be used to obtain various information regarding the security devices 40 and/or articles of merchandise M. It is understood that the computing device may include an illumination source for communicating various types of information to the security device 40 and/or the article of merchandise M in a similar manner. For instance, the article of merchandise M may include a camera for detecting light signals. Furthermore, it is understood that light signals may be used in combination with the embodiments discussed above such that various types of data and information may be obtained and correlated to specific locations. In other embodiments, light signals may be used to update a price label associated with an article of merchandise, such as be transmission of coded light signals to the security device 40 and/or the article of merchandise.

In another embodiment, the security device 40 and/or the article of merchandise M may be configured to capture an image for obtaining various data or information regarding the security device and/or the article of merchandise. For example, the article of merchandise M may capture an image and store the image including various information and data that can be extracted to identify the article of merchandise. In one embodiment, meta data may be embedded in the image file which can be remotely extracted, such as via the controller 20 and/or the remote device 30, to determine a make and model number of the article of merchandise M. In some cases, the article of merchandise M may record the image using technology such as an Eye-Fi memory card that is configured to sync automatically with certain devices image library, which may be used to obtain meta data embedded in the image (e.g., EXIF information).

In some embodiments, the image captured also contains data indicating the location of the article of merchandise taking the image. For example, a position of an article of merchandise M (e.g., a DSLR camera) may involve an initial setup whereby an associate takes a photograph of the position, security device 40, stand, or placard. The position, security device 40, stand, or placard may have a small QR code or other artifact with data regarding physical position/location. In another example, this may be a code on a price label wherein the location data can be used to automatically confirm that the correct article of merchandise is located behind or near its associated price tag. The captured image with the associated location data may be used in conjunction with data identifying the article of merchandise (e.g., meta data) to confirm whether the article of merchandise is in its correct location.

Figure 3:
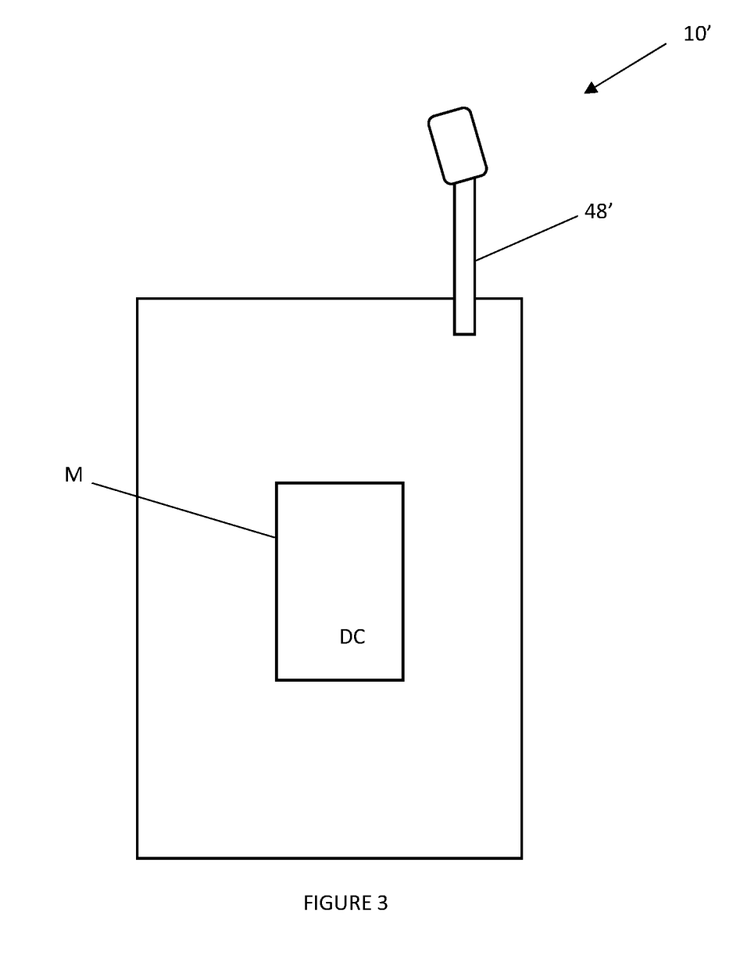
FIG. 3 illustrates a merchandise security system according to one embodiment of the present invention.

In another embodiment illustrated in FIG. 3, machine learning or artificial intelligence ("AI") may be employed for many of the features discussed above, such as obtaining various types of data and monitoring for theft. According to one embodiment, the merchandise security system 10' is utilized for displaying and protecting an article of merchandise M from theft. The merchandise security system 10' may include any desired display platform depending on the article of merchandise M to be protected and may include functionality for charging the article such as via wired contacts or wireless induction. Moreover, the merchandise security system 10' includes a camera 48' that is capable of machine learning or AI (referred to herein as a machine learning camera). The camera 48' could be mounted at each display position for each article of merchandise M, as shown in FIG. 3, or could be mounted generally on a table, wall, or ceiling, and directed at a plurality of articles and platforms simultaneously. The camera 48' may function independently of other cameras in the system or may cooperate with one another. The camera 48' could be positioned to view the articles of merchandise M as well as the platform on which the article is displayed, any details related to the article on display (e.g., price tags or infographics), and/or humans interacting with the articles.

In one embodiment, the merchandise security system 10' also includes a computerized machine learning or AI model including various data and algorithms. In some instances, the model may reside on the controller 20 and/or camera 48'. For instance, the cameras 48' may be configured to communicate data to the controller 20 for taking various actions, such as providing notification of various events (e.g., theft), such as via messages or alerts to one or more remote devices 30. Alternatively, the cameras 48' may be configured to execute the model and communicate directly with one or more remote devices 30 (e.g., using a cloud network 80).

One incarnation of such a model would be to use one or more cameras 48' to obtain data from the retail environment, including data regarding various articles of merchandise and consumers, and to provide predictions based on such data. The model may be populated with various information to facilitate analysis and predictions of various types of information and behaviors in a retail environment. For example, types of information that may be provided to the model include photographs of articles of merchandise and/or security devices, geometries of articles of merchandise and/or security devices, demo applications that run on displayed articles, logos and text on the articles, flashing LEDs or light source signatures or patterns for the articles and/or security devices, sounds originating from the articles and/or security devices, details regarding the surroundings (e.g., labels or price tags), particular motions or behaviors that are indicative of an honest consumer or of theft, etc. Thus, as new articles of merchandise are released or other features of the article, security device, and/or the display are updated, one could simply update the model with updated information. This example model would be configured to detect and/or predict various information relevant to retail displays and shopping behaviors including, but not limited to:

Recognition of the aesthetics of an article of merchandise from all sides and angles and in various lighting.

Recognition of logos and text on the article of merchandise.

Recognition of a user applied sticker or marking on the article of merchandise.

Recognition of a pattern of flashing of an LED or other light source on the article of merchandise or sensor attached to the article.

Recognition of screen details of the article of merchandise such as the home screen on article or a demo loop application running on the article.

Recognition of a user handling the article of merchandise, such as when the user lifts the article (either off of the display counter or a security device)

Recognition of a user handling the article of merchandise when the article is partially obscured by a hand.

Recognition of the display platform and surrounding fixed details (e.g., price tags, countertops, infographics, etc.) and how these details relate to the article of merchandise when the article is in its displayed or charging position.

Recognition of the type of the article of merchandise on display.

Recognition of the display position of the article of merchandise on display.

Recognition of the location of the article of merchandise relative to its display position.

Recognition of an infrared heat signature of the article of merchandise.

Recognition of shopper behavior (e.g., interest or confusion).

Recognition of malicious behavior (e.g., vandalism, pretheft or theft).

Facial recognition to determine repeat shopper or person in criminal database.

In addition to a camera 48', other sensor devices may be utilized by the system 10'. Such sensors may include, but are not limited to, acoustic detection, infrared or ultraviolet wavelength detection, olfactory detection, and pressure or weight detection. The camera(s) 48' and sensors may work in conjunction with one another to deliver information to the retailer, such as instructions, warnings, and/or alarms. These instructions/warnings/alarms could be delivered from the display counter, a security device, or the article itself (e.g., using a software application residing on the article). The camera 48' may pick up the details of the display and deliver those details to the machine learning or AI model, which can analyze the images and trigger events. The events that may be triggered include (but are not limited to):

An audible or visual alarm going off if an article of merchandise disappears from view. This could be a warning to the customer to return the article of merchandise to the display or a full alarm to inform the retail store associates that a theft has occurred.

A notification to a retail store associate that an article of merchandise is being examined by a potential customer who may need assistance.

A notification of a planogram issue such as an article of merchandise not being on display, the wrong article being in a position, or the article not running a proper demo loop.

Notification of suspicious activity such as the camera 48' being obscured or a non-recognized device coming into the photo (such as a "dummy" device a thief might try to swap out for the displayed article).

A notification if a powered article of merchandise had been left on the display counter rather than being returned to the displayed or charging position.

Therefore, embodiments of the present invention provide techniques for acquiring various data from articles of merchandise and security devices, as well as providing various types of information to retailers for analytics, such as ensuring planogram compliance, as well as predicting shopping behaviors to reduce theft and increase customer engagement. Using machine learning cameras provides a retailer with more flexibility in displaying articles of merchandise since the articles need not be restrained by security devices in some embodiments, while at the same time providing the retailer with at least the same information that could be obtained using a security device and allowing the retailer to update its machine learning or AI models at any time.

Figure 4:
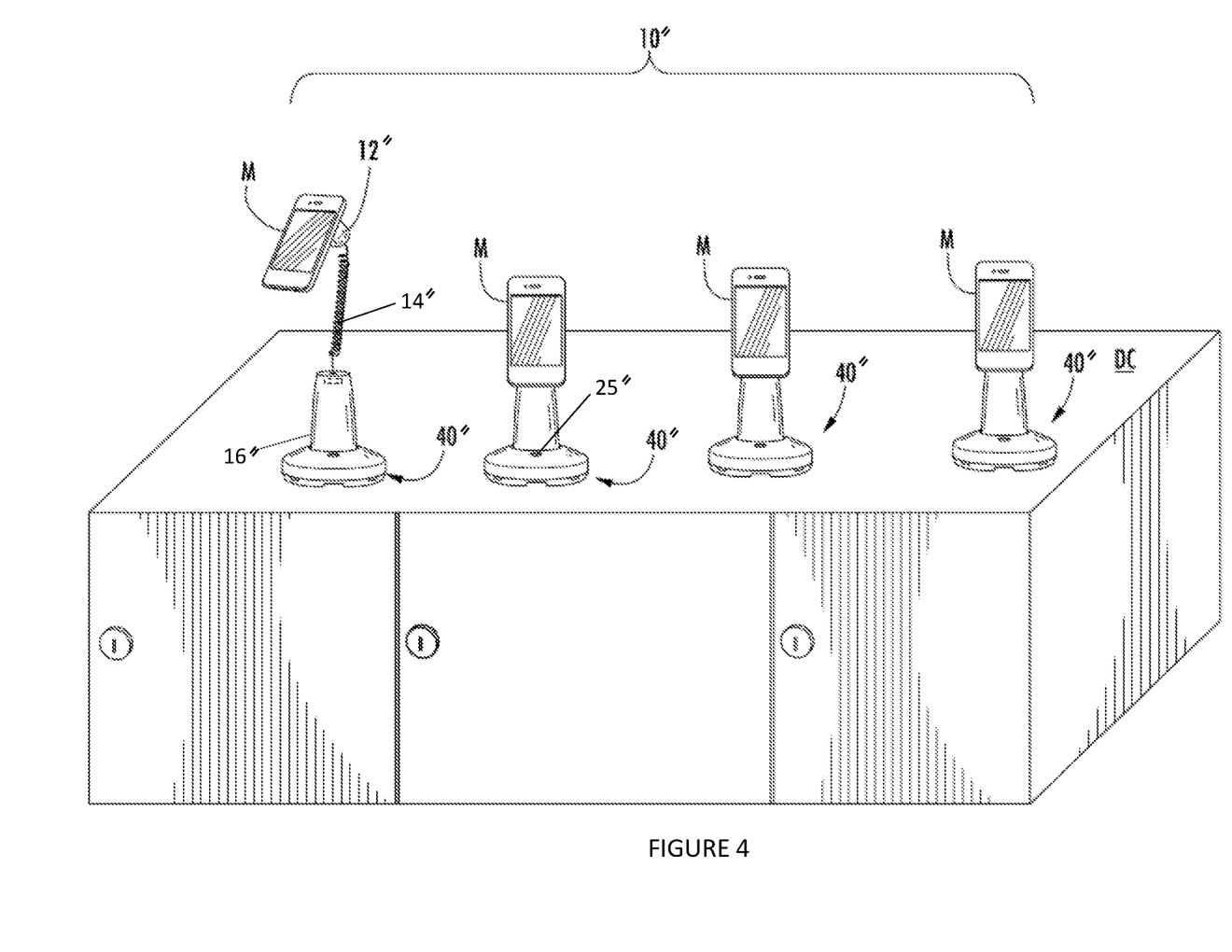
FIG. 4 illustrates a merchandise security system according to one embodiment of the present invention.

FIG. 4 illustrates another embodiment of a merchandise security system 10" for securing articles of merchandise M from theft or unauthorized removal. The system 10" generally includes one or more display positions arranged in a planogram, wherein each display position includes a security device 40" that is supported on a display counter "DC" (e.g., a counter, shelf, support, or the like). A security device 40" may generally include a sensor 12", a tether 14", and a base 16", although other arrangements may be contemplated (e.g., omitting the tether). The sensor 12" is configured to be secured to the article of merchandise M, such as with a pressure-sensitive adhesive, fasteners, and/or bracket arms.

Figure 5:
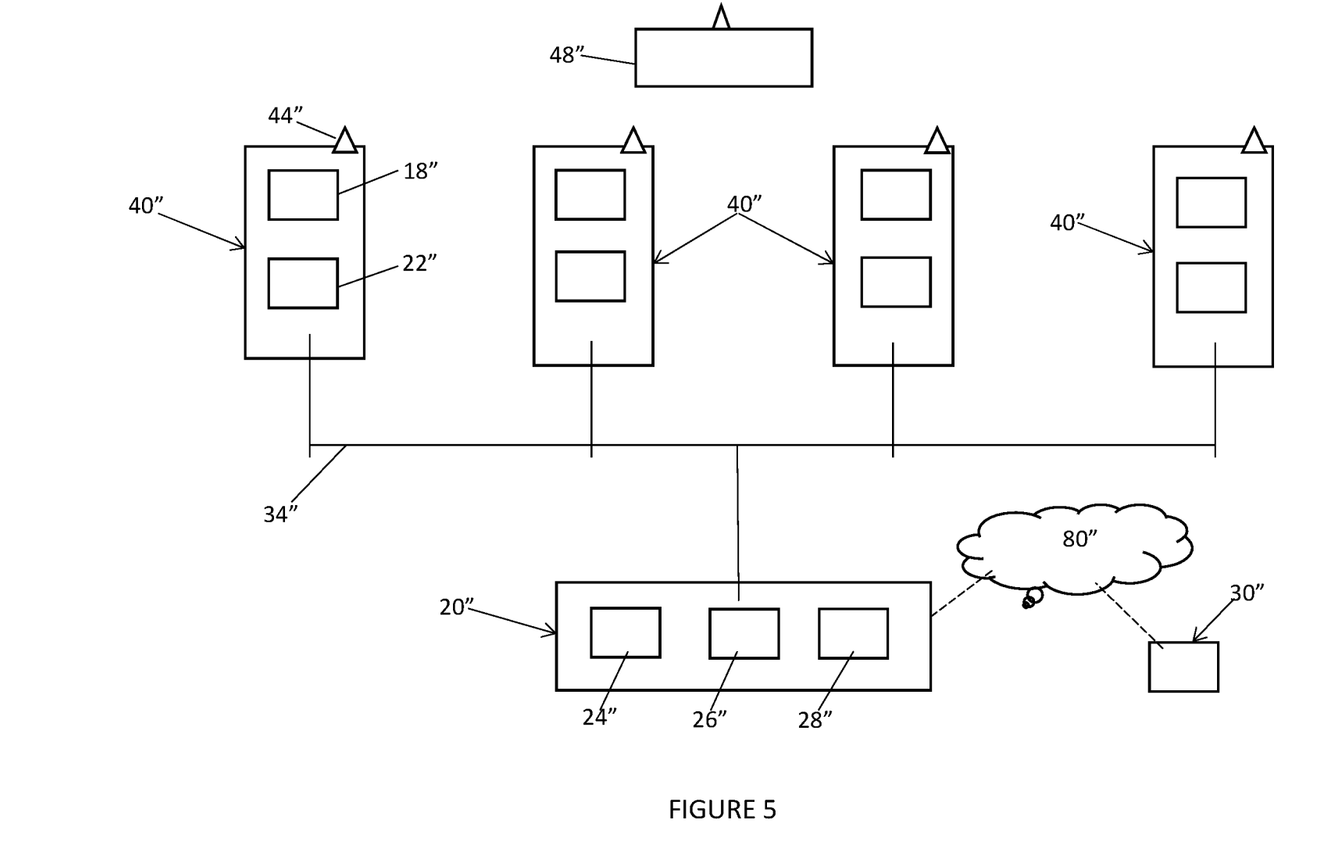
FIG. 5 illustrates a merchandise security system according to one embodiment of the present invention.

The sensor 12" is electrically connected to the tether 14", such as with a connector or via hardwiring. One end of the tether 14" may be electrically connected to the base 16", while the opposite end of the tether may be electrically connected to the sensor 12". The tether 14" and/or base 16" may be electrically connected to or otherwise in electrical communication with a controller 20", as explained in further detail below. In some embodiments, the tether 14" is electrically connected to a recoiler to allow the tether to extend and retract relative thereto. The recoiler may in turn be electrically connected to the controller 20". In other embodiments, the tether 14" is elastic or otherwise extendable and retractable relative to the base 16". Although four security devices are shown in FIGS. 4 and 5, it is understood that the controller 20" may be configured to communicate with any number of security devices, including one or more. Moreover, in some embodiments, one or more controllers 20" may be employed. In some embodiments, the controller 20" and the security devices 40" are independent of one another such that the controller may be positioned remotely from the security devices (e.g., under the display counter DC).

The base 16" is configured to removably support the sensor 12" thereon such that the sensor and article of merchandise M may be removed from the base for inspection and returned to the base. The base 16" may define an opening therethrough that allows the tether 14" to extend and retract relative to the base. It is understood that although a tethered embodiment is shown, it is understood that "tetherless" embodiments may also be utilized such as where the base 16" and the sensor 12" communicate wirelessly. For example, the base 16" and the sensor 12" may be configured to communicate wirelessly in order to ensure that the article of merchandise M is maintained within a predetermined location or distance relative to the base. In other embodiments, the article of merchandise M may be configured to be removably supported directly on the base 16" such that the sensor 12" may be integrated into the article. Example of wireless technology are disclosed in U.S. Pat. Nos. 8,878,673 and 9,437,088, the contents of which are hereby incorporated by reference in their entirety herein.

In some embodiments, the sensor 12" and/or base 16" may include alarming circuitry 18" or the like that is configured to determine whether various security events (e.g., removal of the article of merchandise from the security device 40" or authorized location) have occurred for generating a security signal, such as an audible and/or a visual alarm or signal (see, e.g., FIG. 5). The sensor 12" and/or base 16" may also include an alarm 22" (e.g., a piezoelectric device) that is configured to generate an audible alarm or signal. In some cases, the sensor 12" and/or base 16" may include a visual indicator (e.g., an LED) for emitting a visual signal when the alarming circuitry 18" is armed and/or alarming. Moreover, the sensor 12" and/or base 16" may include a transfer port 25" that is configured to communicate with a key for arming and/or disarming the alarming circuitry 18" (see, e.g., FIG. 4). In one embodiment, the transfer port 25" is configured to communicate wirelessly with a key in order to determine whether the key is authorized to arm and/or disarm the alarming circuitry 18". According to some embodiments, the key is similar to that described in U.S. Pat. No. 7,737,845, the contents of which are hereby incorporated by reference in their entirety herein. According to one embodiment, the sensor 12" may include a pressure switch or the like that is configured to detect when the article of merchandise M has been removed from the sensor. The alarming circuitry 18" may be configured to detect the removal of the article of merchandise M and/or cutting of the tether 14" and generate a security signal (e.g., an audible and/or a visual alarm) in response thereto.

The controller 20" may include a processor 24", CPU, or the like that is configured to facilitate communication with each of the security devices 40", both individually and collectively. For example, the controller 20" may be a digital interface box ("DIB") or a power interface box ("PIB") in some embodiments. The controller 20" may include communications circuitry 26" that is configured to transmit and receive signals and data from each of the security devices 40" and/or articles of merchandise M. The controller 20" may also include a memory 28" for storing various data regarding each of the security devices 40" and/or articles of merchandise M, as explained in further detail below. However, in other cases, the memory 28" may be a standalone component external to the controller, and in some embodiments, may be remotely located from the controller (e.g., with a remote device 30"). In one embodiment, the controller 20" is electrically connected to each of the articles of merchandise M and/or the security devices 40" via "wired" means, such as one or more electrical conductors 34". The controller 20" may be configured to transmit power to each of the security devices 40" and/or the articles of merchandise M via the electrical conductors 42". In other embodiments, the controller 20", articles of merchandise M, and/or the security devices 40" may be configured to communicate with one another wirelessly. In order to provide power to the articles of merchandise M and/or the security devices 40", the articles and/or security devices may utilize various power charging functionality, such as electrical contacts or inductive charging technology. In addition, the controller 20" may be configured to transmit and/or regulate the voltage provided to each of the security devices 40" and/or articles of merchandise M. For example, the controller 20" may be in electrical communication with an input power source 46" and configured to transmit power at the appropriate voltage to each of the security devices 40" and/or the articles of merchandise M. Furthermore, it is understood that although the base 16" and controller 20" may be separate components in some embodiments, the base and controller may be integrated as a single component in other embodiments. For instance, the controller 20" may be housed in the base 16", and each base may include a respective controller.

In some embodiments, the controller 20" is configured to obtain data from or with the articles of merchandise M. For example, the data may be stored in a memory of the article of merchandise M, and the controller 20" may obtain at least a portion of the stored data. In some cases, the article of merchandise M may transmit the data from its internal memory to a sensor 12", controller 20", or any other desired device. The same controller 20" can communicate with the security devices 40" and the articles of merchandise, although it is understood that more than one controller could be employed, with separate controllers communicating with the security devices and articles of merchandise. The controller 20" may be configured to obtain the data directly or indirectly from the articles of merchandise. For example, each sensor 12" may be configured to communicate with a respective article of merchandise attached thereto to obtain data and subsequently communicate the data to the controller 20". In other embodiments, the controller 20" may receive the data directly from the articles of merchandise M. In some cases, the data is the type of article of merchandise M attached to a sensor 12" (e.g., a manufacturer and model of an article of merchandise). The type of article of merchandise M may allow the controller 20" to determine the power requirements of the specific type of article prior to sending power to the device. It is understood that various types of data and information may be obtained from the article of merchandise such as, for example, the number of "pulls" or "pickups" of a particular article of merchandise relative to the base, the type of article, the location of the article, the location of the security device, the power status of the article, retail store information and location, the occurrence and time of a power loss to the security device, a key ID, number and time of interactions with a key, etc. Thus, the controller 20" may obtain data periodically or in real time, or a user could use a remote device 30" to request information regarding a specific article(s) of merchandise M by communicating with the controller 20". Additional examples of types of data that may be collected in response to interaction with the article of merchandise may be found, for example, in U.S. Publication No. US 2018/0035827, entitled Systems and Methods for Acquiring Data from Articles of Merchandise on Display, the contents of which are hereby incorporated by reference in their entirety herein.

In some embodiments, the controller 20" and/or security device 40" may be configured to communicate with a remote device 30", such as a retailer's laptop, tablet, or other electronic device through a cloud network 80". In one example, the remote device 30" may be a retailer's electronic device for managing various data received from one or more controllers 20" and/or security devices 40". In one particular embodiment, a plurality of controllers 20" and/or security devices 40" are configured to communicate with one or more retailer's electronic devices over the network 80". For instance, the cloud network 80" may facilitate communication with a plurality of tablet devices used by sales associates within a retail environment. Communication over the network 80" may occur wirelessly. It is understood that the articles of merchandise M, remote devices 30", security devices 40", and/or the controller 20" may communicate with any desired means, such as cellular networks, Wi-Fi, radiofrequency, Bluetooth communication, and the like. The articles of merchandise M, controller 20", security device, and/or the remote device 30" may include communications circuitry or a transceiver that is configured to facilitate such communication with one another. One or more gateways and/or nodes may be used to facilitate communication between the articles M, controller 20", security device 40", and/or the retailer's electronic device(s). For instance, a gateway (e.g., a router) between the controller 20" and the cloud network 80" may be configured to facilitate communication with a retailer's gateway and may be configured to allow the retailer to provide and receive data from the system 10". The retailer may be able to direct various commands via the cloud network 80" such as, for example, ensuring planogram compliance (e.g., the articles of merchandise and/or security devices are located in their assigned locations) and tracking system usage. In some embodiments, such commands could include requesting data from the controller 20", powering up or down one or more articles of merchandise M, arming or disarming a security device 40", performing a roll call of one or more articles of merchandise (either at a particular time or after an alarming event), determining a location of an alarming security device 40", identifying a specific key that armed/disarmed/locked/unlocked a particular security device, remotely enabling or disabling an article of merchandise, remotely locking down an article of merchandise, checking the power status of an article of merchandise, tracking usage of an article of merchandise, tracking one or more article of merchandise (e.g., via serial number or other ID), assigning particular keys to authorized users, and/or directing a camera to record the location of an alarming security device. As such, a retailer may be able to more effectively manage any number of features regarding one or more security devices 40".

In one embodiment, the security system 20" may utilize light-based technology (e.g., Visible Light Communication (VLC)) to determine various types of information regarding a security device 40" and/or article of merchandise M. For instance, the security device 40" and/or article of merchandise M may include an illumination source 44", such as an LED, that is configured to generate a uniquely coded light signal that may be used to provide various types of information and data and/or to determine the location of a particular illumination source 44" that is at a known location. The illumination source 44" may be configured to communicate with a computing device 48" that is configured to detect the uniquely coded light signals generated by the illumination source. For instance, the computing device 48" may include a camera for detecting such coded light signals. The coded light signals may be generated via activation of the illumination source 44" in a predetermined sequence or pattern. In some cases, the coded light signals may be indicative of specific information or data associated with the security device 40" and/or the article of merchandise, such as the types of information discussed above (e.g., a serial number of the article of merchandise). The computing device 48" may include a software application for facilitating communication with its camera and interpreting the light signals. Using the coded light signals, the computing device 48" may be configured to correlate the information or data with the security device 40" and/or the article of merchandise based on a known location of the security device and/or article of merchandise. For example, if a planogram indicates a particular location of a security device 40", the security device may be configured to communicate a light signal with information or data regarding the security device or associated article of merchandise. In other embodiments, the security device 40" and/or the article of merchandise M may be configured to communicate light signals indicative of its location. One or more computing devices 48" may be configured to communicate with one or more security devices 40", articles of merchandise M, controllers 20", and/or remote devices 30", such as via the cloud network 80", wired communications, and/or wireless communications. Thus, the security devices 40" and/or articles of merchandise M may be configured to communicate directly with the computing devices 48" in some embodiments. The computing device 48" may be configured to focus on, or block out, particular regions or zones that include security devices 40" and/or articles of merchandise M. In some cases, the computing device 48" may be configured to detect a particular QR code that may be associated with a security device 40" and/or an article of merchandise M. In this regard, the computing device 48" may be configured to detect the QR code and correlate the QR code with a particular security device 40" and/or article of merchandise M at a known location. Therefore, in some embodiments, VLC technology may be used to obtain various information regarding the security devices 40" and/or articles of merchandise M. It is understood that the computing device may include an illumination source for communicating various types of information to the security device 40" and/or the article of merchandise M in a similar manner. For instance, the article of merchandise M may include a camera for detecting light signals. Furthermore, it is understood that light signals may be used in combination with the embodiments discussed above such that various types of data and information may be obtained and correlated to specific locations. In other embodiments, light signals may be used to update a price label associated with an article of merchandise, such as be transmission of coded light signals to the security device 40" and/or the article of merchandise.

In another embodiment, the security device 40" and/or the article of merchandise M may be configured to capture an image for obtaining various data or information regarding the security device and/or the article of merchandise. For example, the article of merchandise M may capture an image and store the image including various information and data that can be extracted to identify the article of merchandise. In one embodiment, meta data may be embedded in the image file which can be remotely extracted, such as via the controller 20" and/or the remote device 30", to determine a make and model number of the article of merchandise M. In some cases, the article of merchandise M may record the image using technology such as an Eye-Fi memory card that is configured to sync automatically with certain devices image library, which may be used to obtain meta data embedded in the image (e.g., EXIF information).

In some embodiments, the image captured also contains data indicating the location of the article of merchandise taking the image. For example, a position of an article of merchandise M (e.g., a DSLR camera) may involve an initial setup whereby an associate takes a photograph of the position, security device 40", stand, or placard. The position, security device 40", stand, or placard may have a small QR code or other artifact with data regarding physical position/location. In another example, this may be a code on a price label wherein the location data can be used to automatically confirm that the correct article of merchandise is located behind or near its associated price tag. The captured image with the associated location data may be used in conjunction with data identifying the article of merchandise (e.g., meta data) to confirm whether the article of merchandise is in its correct location.

Figure 6:
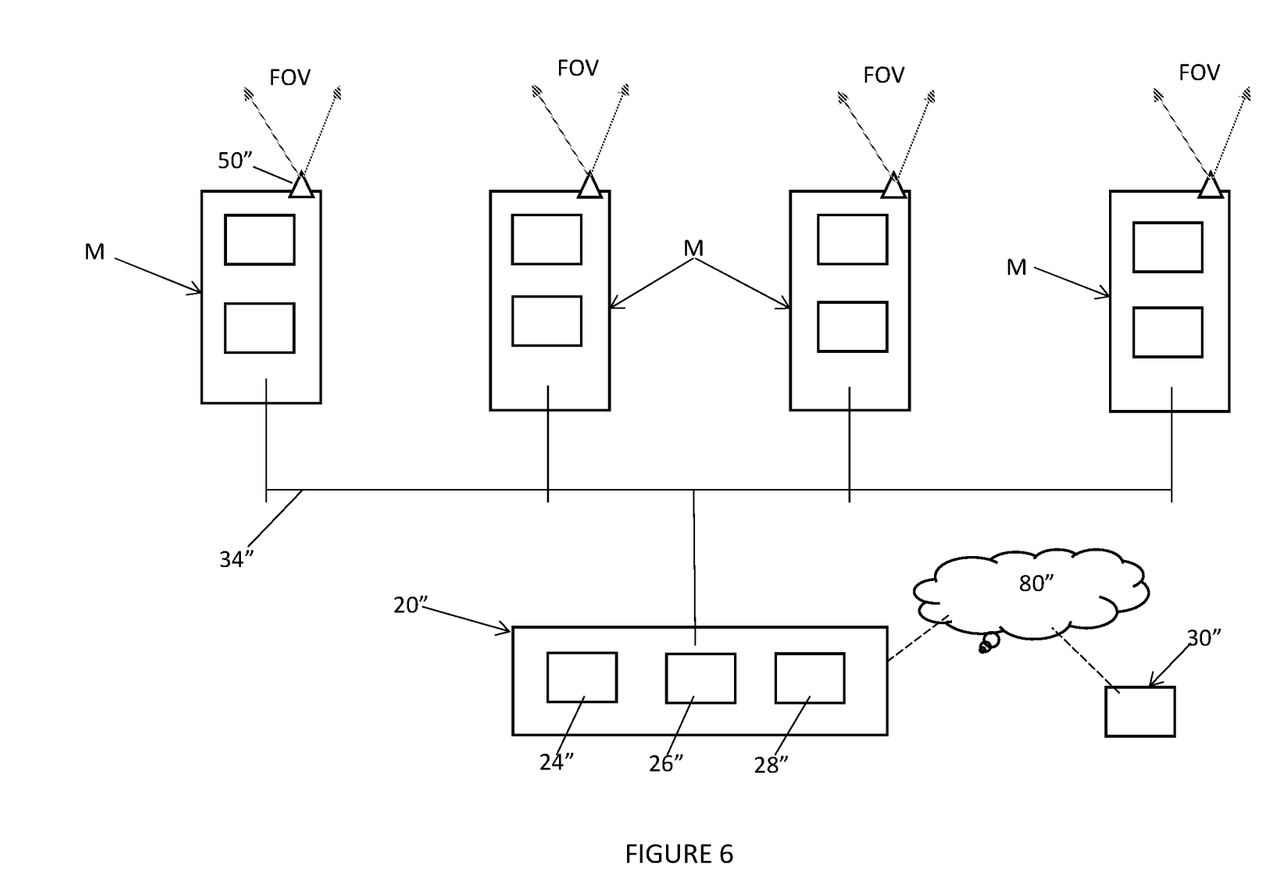
FIG. 6 illustrates a merchandise security system according to one embodiment of the present invention.

In another embodiment, computer vision technology may be employed to obtain or provide various types of data (see, e.g., FIG. 6). For example, each article of merchandise M may have a camera 50" configured to capture one or more images for obtaining various data or information regarding the article of merchandise and/or its environment (e.g., a retail store). In some cases, computer vision may be employed to analyze the field of view ("FOV") of the camera 50" of the article of merchandise and to determine where the article is located by matching the camera's FOV to known images of its surroundings (e.g., the ceiling or inside of a retail store). Essentially, when the article of merchandise M is on display and is known to be in a correct location (e.g., pointing at the ceiling), the camera may record what the camera is pointing at and then watch to determine if the image changes (e.g., the camera is pointing at the ceiling or the image is obscured). A memory 28" or database may be populated and maintained including various FOV images of each of the cameras 50", such as FOV images at each display location for each article of merchandise M. After the memory 28" of many possible FOVs in each display and/or lifted location is populated, computer vision may be able to determine where the article of merchandise M is located and/or if the article has been placed in an incorrect location. In some cases, computer vision may be used to stitch adjacent images into a more complete view of the retail environment. Moreover, the articles of merchandise may also be configured to communicate with one another to exchange and/or stitch images together (e.g., in a wireless mesh network). As such, computer vision may be utilized to perform planogram compliance functions and obtain various types of data (such as the types of data discussed herein) with only the articles of merchandise themselves (i.e., security devices are not required in all embodiments). However, the articles of merchandise may be used in conjunction with security devices 40" (such as those discussed above) in order to protect the articles from theft. In some embodiments, each of the articles of merchandise M may be equipped to perform computer vision analysis, while in other embodiments, computer vision analysis may be performed remotely, such as via one or more controllers 20" and/or remote devices 30".

It is understood that computer vision technology may be used to obtain various types of information, such as a location of the article of merchandise M, whether the article has been lifted from a display location, and/or whether the article is in an incorrect location. Each article of merchandise M may have one or more cameras for obtaining FOV images, and each article on display may obtain its own images. Moreover, each of the articles of merchandise M may be configured to capture images from various orientations while on display (e.g., portrait and landscape). If the environment is difficult for cameras to differentiate the articles of merchandise M from one another (e.g., all cameras viewing the ceiling), the environment may be marked with unobtrusive targets or identifiers that each of the cameras can see. For instance, the targets could be low contrast so as to be as unobtrusive and unnoticeable as possible on the environment. In some embodiments, markings may be projected in the environment for differentiated different images. For example, a laser generated grid, ID numbers, or the like may be used that each of the cameras can see (e.g., using a light projector). In some cases, markings are projected only occasionally (e.g., at the start of each day or work shift), and each of the cameras watch for the markings to appear for determining respective locations. In one example, articles of merchandise M may be instructed exactly when the environment markings will appear (e.g., over a network) so that the cameras will not be required to watch the environment continuously. In one embodiment, techniques may be used to filter out motion to eliminate false negatives, such as for example, false negatives based on customers walking around or obscuring the FOV.

In another embodiment, techniques for obtaining identification information from the security devices are provided. While some sensors are able to read identification information (e.g., a serial number) directly from the item of merchandise M through a physical interface (e.g., via a USB port), if the item of merchandise does not have a USB connection or like interface, the identification information of the sensor itself can be used to associate a security device with its planogram position. This information can be physically matched with the location of the security device to determine location of the security device. As discussed above, the security devices may have wireless communication capability. However, with wireless security devices, there may no longer be a wired, physical connection between the sensor and the network infrastructure to obtain identification information. One way to accomplish this is to print or laser-etch a barcode or other visual marking containing the sensor identifier on the exterior of the sensor which can then be read with a mobile device camera or like device and used to identify the sensor.

In another embodiment of using wireless communication to obtain identification information, the sensor may emit a visual indicator for identifying the sensor. In this regard, sensors often have an LED used to indicate protection or alarming status. For example, this LED can be modulated by the sensor itself to emit the sensor identifier. A mobile device or any like device with a camera can then use computer vision techniques to receive the serial number from the sensor without any need for additional external markings or special purpose interfaces (like USB) for collecting the identifier. The identifier may further incorporate error correction and encryption/authentication as needed.

In some embodiments, the sensor will often be in close physical proximity to a customer barcode that uniquely identifies the security device and planogram position. In some cases, the retailer may wish to associate the sensor identifier with the identifier of the item of merchandise and/or location of the security device during an initial set up process. In one example during the set up process, the sensor is configured to capture both the sensor identifier emitted from the sensor LED as well as the associated barcode or other visual identifier of the item of merchandise in a single operation instead of requiring the installer to first read the sensor identifier and then scan the display location barcode or other visual identifier in two separate actions.

According to one example embodiment, the sensor identifier is programmed into flash at the time of manufacturing the sensor. When sensor is installed at the customer site, the installer initiates a pairing or like set up mode (e.g., by using the existing security plunger, or another button, or by simply powering on the sensor for the first time). The sensor then encodes and optionally encrypts its identifier and begins emitting the identifier by blinking the LED. The installer may aim a mobile device camera at the LED, which is used to decode the identifier from the blinking LED light pattern and uses it to enroll and provision the sensor for the customer.

Mobile device cameras have different frame rates, the minimum being about 30 fps with a max of about 120-240 fps typically. The mobile device will pick the highest fps offered on a particular device in order to speed up the reception of the identifier. In some embodiments, the sensor does not know the framerate of the camera and will therefore retransmit the identifier at different speeds, starting with the fastest. For example, once at 240 fps, then 120 fps, then 60 fps, finally 30 fps and so on. In most cases, the installer's camera will be a handheld mobile device and will be subject to some shaking. This can actually be used to improve the effective framerate of the camera if necessary since multiple blinks of the LED could be "smudged" across a single frame of video and then decoded as multiple bits of information.

Therefore, embodiments of the present invention provide techniques for acquiring various data from or using articles of merchandise and/or security devices, as well as providing various types of information to retailers for analytics, such as ensuring planogram compliance. Using vision-based techniques may provide a retailer with more flexibility in displaying articles of merchandise since the articles need not be restrained by security devices in some embodiments, while at the same time providing the retailer with at least the same information that could be obtained using a security device.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A merchandise security system comprising:
a plurality of articles of merchandise on display in a retail store and arranged in a planogram;
a plurality of security devices each configured to be attached to a respective one of the articles of merchandise, each of the security devices configured to detect unauthorized removal of the security device from the respective article of merchandise;
at least one machine learning camera configured to capture images of one or more of the articles of merchandise for obtaining information regarding the articles of merchandise;
a database configured to store a collection of images captured by the at least one machine learning camera; and
a controller configured to communicate with the at least one machine learning camera and the database,
wherein the at least one machine learning camera or the controller is configured to make predictions based on the information obtained by the at least one machine learning camera,
wherein the at least one machine learning camera or the controller is configured to provide notifications based on the information obtained by the at least one machine learning camera, and
wherein the at least one machine learning camera or controller is configured to compare the images captured by the at least one machine learning camera to the collection of images for determining information regarding the planogram.

2. The merchandise security system of claim 1, further comprising a plurality of machine learning cameras, each machine learning camera associated with a respective article of merchandise.

3. The merchandise security system of claim 1, wherein the at least machine learning camera is configured to wirelessly communicate with a remote device for providing the information obtained from the machine learning camera.

4. The merchandise security system of claim 1, wherein the at least one machine learning camera is configured to capture images of the security devices for detecting information regarding the security devices, wherein the at least one machine learning camera or the controller is configured to make predictions based on the information regarding the security devices by the at least one machine learning camera, and wherein the at least one machine learning camera or the controller is configured to provide notifications based on the information the security devices by the at least one machine learning camera.

5. The merchandise security system of claim 4, wherein the plurality of security devices comprises alarming circuitry for generating an audible and/or a visual signal in response to removal of the article of merchandise from the security device.

6. The merchandise security system of claim 1, wherein the at least one machine learning camera is configured to obtain the information comprising at least one of logos and text of the article of merchandise, a flashing light source of the articles of merchandise, screen display details of the articles of merchandise, movement of the articles of merchandise, types of articles of merchandise, display positions of the articles of merchandise, or locations of the articles of merchandise.

7. The merchandise security system of claim 1, wherein the at least one machine learning camera or the controller is configured to make predictions comprising at least one of shopping behavior, vandalism, or theft.

8. The merchandise security system of claim 1, wherein the at least one machine learning camera or the controller is configured to provide notifications comprising at least one of an audible or visual alarm in response to one of the articles of merchandise disappearing from view of the at least one machine learning camera, a notification to assist a customer, or a notification regarding planogram non-compliance.

9. The merchandise security system of claim 1, wherein the controller or the plurality of articles of merchandise is configured to wirelessly communicate with a remote device for providing the images obtained from each of the cameras.

10. The merchandise security system of claim 1, a wherein the database comprises a collection of expected images captured by the at least one machine learning camera; and
wherein the at least one machine learning camera is configured to capture images of its surroundings, and
wherein the controller is configured to compare the images captured by the at least one machine learning camera to the collection of expected images for determining information regarding the planogram.

11. The merchandise security system of claim 1, further comprising an AI algorithm residing on the at least one machine learning camera or the controller for making predictions based on the information obtained by the at least one machine learning camera.

12. The merchandise security system of claim 1, wherein the at least one machine learning camera or the controller is configured to provide a visual and/or an audible notification regarding planogram non-compliance.

13. The merchandise security system of claim 1, wherein the collection of images comprises various field of view (FOV) images.

14. A method for displaying and securing articles of merchandise, the method comprising:
capturing images of one or more articles of merchandise on display in a retail store with at least one machine learning camera, wherein the one or more articles of merchandise are arranged in a planogram;
capturing images of a plurality of security devices each configured to be attached to a respective one of the articles of merchandise and to detect unauthorized removal of the security device from the respective article of merchandise;
storing a collection of images captured by the at least one machine learning camera in a database;
obtaining information regarding the articles of merchandise with the at least one machine learning camera based on the captured images;
communicating between a controller, the at least one machine learning camera, and the database;
making predictions based on the obtained information with the at least one machine learning camera or the controller;
providing notifications based on the obtained information with the at least one machine learning camera or the controller; and
comparing the captured images to the collection of images with the at least one machine learning camera or controller for determining information regarding the planogram.

15. The method of claim 14, wherein the providing notifications step is performed by the at least one machine learning camera.

16. The method of claim 14, wherein making predictions comprises making predictions based on shopping behavior or theft behavior.

17. The method of claim 14, wherein providing notifications comprises generating an alarm in response to a security event.

18. The method of claim 14, further comprising populating the at least one machine learning camera with information in order to facilitate the step of making predictions.

19. The method of claim 18, wherein populating comprises populating with information comprising at least photographs of the articles of merchandise, geometries of the articles of merchandise, applications operating on the articles of merchandise, logos and text on the articles of merchandise, light signatures or patterns emitted by the articles of merchandise, sounds originating from the articles of merchandise, details regarding surroundings of the articles of merchandise, or motions or behaviors that are indicative of an honest consumer or theft.

20. The method of claim 14, further comprising, obtaining information regarding the security devices with the at least one machine learning camera based on the images captured of the security devices, making predictions based on such information regarding the security devices with the at least one machine learning camera or the controller, and providing notifications based on such information regarding the security devices with the at least one machine learning camera or the controller.

* * * * *